(12) United States Patent
Iwabuchi et al.

(10) Patent No.: US 11,479,108 B2
(45) Date of Patent: Oct. 25, 2022

(54) DUMP TRUCK

(71) Applicant: Hitachi Construction Machinery Co., Ltd., Tokyo (JP)

(72) Inventors: Yuutarou Iwabuchi, Ushiku (JP); Shinichirou Hagihara, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 17/273,599

(22) PCT Filed: Nov. 4, 2019

(86) PCT No.: PCT/JP2019/043174
§ 371 (c)(1),
(2) Date: Mar. 4, 2021

(87) PCT Pub. No.: WO2020/095865
PCT Pub. Date: May 14, 2020

(65) Prior Publication Data
US 2021/0252967 A1 Aug. 19, 2021

(30) Foreign Application Priority Data
Nov. 8, 2018 (JP) .............................. JP2018-210483

(51) Int. Cl.
*B60B 35/14* (2006.01)
*B60K 7/00* (2006.01)
(Continued)

(52) U.S. Cl.
CPC ............ *B60K 7/0007* (2013.01); *B60B 35/14* (2013.01); *B60K 17/046* (2013.01);
(Continued)

(58) Field of Classification Search
CPC ................ B60K 7/0007; B60K 17/046; B60K 2007/0092; B60B 35/14; B60P 1/16; B60Y 2200/142
See application file for complete search history.

(56) References Cited

U.S. PATENT DOCUMENTS

| 2004/0065169 A1 | 4/2004 | Ciszak et al. |
| 2009/0215569 A1 | 8/2009 | Shibukawa et al. |

(Continued)

FOREIGN PATENT DOCUMENTS

| CN | 201677862 U | * 12/2010 | |
| EP | 2360047 B1 | * 7/2012 | ........... B60K 17/046 |

(Continued)

OTHER PUBLICATIONS

International Search Report (PCT/ISA/210) issued in PCT Application No. PCT/JP2019/043174 dated Jan. 21, 2020 with English translation (five (5) pages).

(Continued)

*Primary Examiner* — Jacob B Meyer
(74) *Attorney, Agent, or Firm* — Crowell & Moring LLP

(57) ABSTRACT

A vehicle drive unit (11) includes a spindle (12) on which a female spline portion (12G) is formed, a wheel (15) disposed on an outer peripheral side of the spindle (12), wheel bearings 17, 18 that rotatably support the wheel (15) in relation to the spindle (12), an electric motor (21) located on an axial one side of the spindle (12), a shaft (22) connected to an output shaft (21B) of the electric motor (21), a planetary gear reduction device (25) disposed between the shaft (22) and the wheel (15), and a shaft bearing (46) that rotatably supports the shaft (22) in relation to the spindle (12). A retainer (42) retaining the shaft bearing (46) is disposed on an inner peripheral surface side of the spindle (12), and a male spline portion (42E), which is spline- (Continued)

coupled to a female spline portion (12G) of the spindle (12), is disposed on the retainer (42).

2 Claims, 7 Drawing Sheets

(51) Int. Cl.
  *B60K 17/04* (2006.01)
  *B60P 1/16* (2006.01)
(52) U.S. Cl.
  CPC ......... *B60K 2007/0092* (2013.01); *B60P 1/16* (2013.01); *B60Y 2200/142* (2013.01)

(56) References Cited

U.S. PATENT DOCUMENTS

| | | | |
|---|---|---|---|
| 2011/0200282 A1* | 8/2011 | Shinohara | B60K 17/046 384/462 |
| 2013/0056289 A1* | 3/2013 | Shibukawa | F16D 65/853 180/62 |
| 2013/0062926 A1* | 3/2013 | Shibukawa | F16D 1/108 298/19 R |
| 2014/0011622 A1 | 1/2014 | Sone et al. | |
| 2017/0037902 A1 | 2/2017 | Sone et al. | |
| 2017/0080799 A1 | 3/2017 | Messink et al. | |
| 2021/0252967 A1* | 8/2021 | Iwabuchi | B60B 35/14 |

FOREIGN PATENT DOCUMENTS

| | | | | |
|---|---|---|---|---|
| EP | 2471680 A1 | * | 7/2012 | ........... B60B 35/125 |
| EP | 2567848 A1 | * | 3/2013 | ........... B60K 17/046 |
| EP | 2567849 A1 | * | 3/2013 | ........... B60K 17/046 |
| EP | 2568199 A1 | * | 3/2013 | ........... B60K 17/046 |
| EP | 2567848 B1 | * | 12/2014 | ........... B60K 17/046 |
| EP | 2 942 223 A1 | | 11/2015 | |
| EP | 3578856 A4 | * | 11/2020 | ............... B60K 7/00 |
| JP | 2002-161933 A | | 6/2002 | |
| JP | 2006264395 A | * | 10/2006 | |
| JP | 2007-263350 A | | 10/2007 | |
| JP | 4490317 B2 | * | 6/2010 | |
| JP | 2011-42322 A | | 3/2011 | |
| JP | 2011042322 A | * | 3/2011 | ........... B60B 35/125 |
| JP | 2012-197871 A | | 10/2012 | |
| JP | 2013-60049 A | | 4/2013 | |
| JP | 2013060049 A | * | 4/2013 | ........... B60K 17/046 |
| JP | 5450542 B2 | * | 3/2014 | ........... B60K 17/046 |
| JP | 5687537 B2 | | 3/2015 | |
| WO | WO-2018018868 A1 | * | 2/2018 | ............. B60K 17/04 |
| WO | WO-2018230270 A1 | * | 12/2018 | ............... B60K 7/00 |
| WO | WO-2020095865 A1 | * | 5/2020 | ............. B60B 35/14 |

OTHER PUBLICATIONS

Japanese-language Written Opinion (PCT/ISA/237) issued in PCT Application No. PCT/JP2019/043174 dated Jan. 21, 2020 (three (3) pages).
Extended European Search Report issued in European Application No. 19881993.0 dated Jun. 27, 2022 (seven (7) pages).

* cited by examiner

DUMP TRUCK

TECHNICAL FIELD

The present invention relates to a dump truck that is suitably used in transporting crushed stones, earth and sand, and the like excavated in a mine or the like.

BACKGROUND ART

There is known a dump truck as a large-sized transporter vehicle for transporting crushed stones, earth and sand, and the like excavated in a mine or the like. The dump truck is provided with a vehicle body in which vehicle wheels are arranged, and a vessel (loading platform) disposed to be capable of lifting/tilting on a frame of the vehicle body. The vehicle body of the dump truck is provided with a vehicle drive unit for driving left and right front wheels and left and right rear wheels. The dump truck travels and moves to a desired transport site by the vehicle drive unit in a state where cargoes of crushed stones or the like are loaded on the vessel.

Here, a vehicle drive unit in the dump truck includes a spindle having one axial side attached to the vehicle body, a wheel that is positioned in the other axial side of the spindle to be disposed on an outer peripheral side of the spindle and on which a tire is attached, wheel bearings that rotatably support the wheel in relation to the spindle, an electric motor located on the axial one side of the spindle, a shaft connected to an output shaft of the electric motor, a planetary gear reduction mechanism that decelerates rotation of the shaft, which is transmitted to the wheel, and a shaft bearing that rotatably supports the shaft in relation to the spindle.

Here, the shaft connected to the output shaft of the electric motor is rotatably supported by the shaft bearing. This shaft bearing is attached through a bearing retainer to an inner peripheral surface side of the spindle. That is, an attaching flange in a disc shape is disposed on an inner peripheral surface of the spindle to project to a radially inner side. The bearing retainer is attached to this attaching flange using bolts or the like. The shaft bearing is supported by the bearing retainer (Patent Document 1).

Incidentally, in the large-sized dump truck used in the mine or the like, not only the weight of the vehicle body is large but also the weight of the cargoes loaded on the vessel is also large. As a result, large loads act on the spindle supporting the wheel, to which the tire is attached, in relation to the vehicle body by the weight of the vehicle body and the weight of the cargoes. A dump truck tire on the market has an upper limit to an outer radial dimension. Therefore, the dump truck large in vehicle body weight generally responds to an increase on the vehicle body weight by increasing a width dimension of the tire. Thereby, since an axial dimension of the spindle increases and a bending load acting on the spindle also increases, it is necessary to enhance strength of the spindle.

In general, in the dump truck according to the conventional technology the spindle of the vehicle drive unit is formed by casting. Therefore, in the dump truck large in vehicle body weight it is preferable to form the spindle by forging for enhancing the strength of the spindle. In this case, the forged spindle has the strength higher than the cast spindle and further, can be formed in a compact manner. Therefore, it is possible to trim the weight of the spindle. Accordingly, the dump truck provided with the forged spindle can increase capacities of the cargoes by an amount corresponding to a reduction in weight of the vehicle body to enhance workability at the time of transporting the cargoes.

PRIOR ART DOCUMENT

Patent Document

Patent Document 1: Japanese Patent Laid-Open No. 2011-42322 A

SUMMARY OF THE INVENTION

Incidentally, it is not realistic to manufacture the spindle by stamping forging using a huge forging die. Therefore, in a case of forming a spindle large in shape by forging, the spindle is manufactured by free forging using a core bar. In a case of forming a cylindrical spindle by free forging, in a state where a core bar is caused to be fitted in an inner peripheral surface side of a material (forging material) of the hollow spindle, it is necessary to apply the forging to an outer peripheral side of the material.

However, in a case of forming the spindle by the free forging using the core bar, it is necessary to remove the core bar from the inner peripheral surface side of the forged spindle. Therefore, a complicated concavity and convexity shape cannot be formed on the inner peripheral surface of the spindle. In this way, even in a case of trying to form the spindle by forging for enhancing the strength of the spindle, there is posed a problem that it is difficult to dispose an attaching flange for attaching a bearing retainer on the inner peripheral surface of the spindle. It should be noted that there is a method in which a spindle having a thick cylindrical portion is in advance formed by forging, and after that, the attaching flange is formed by cutting the inner peripheral surface of the thick cylindrical portion. However, in this method, a yield ratio of the material is low and cutting work of the material becomes necessary in addition to the forging work, and as a result, there is a problem that a manufacturing cost thereof increases.

An aspect of the present invention has an object of providing a dump truck in which a retainer composed of a material different from a spindle is disposed on an inner peripheral surface side of the spindle to which a shaft bearing can be attached using this retainer.

The aspect of the present invention is applied to a dump truck provided with a vehicle drive unit comprising a cylindrical spindle an axial one side of which is attached to a vehicle body and on an inner peripheral surface at an axial other side of which a female spline portion is formed, a wheel that is positioned in the axial other side of the spindle to be disposed on an outer peripheral side of the spindle and on which a tire is attached, wheel bearings that are arranged between the spindle and the wheel to rotatably support the wheel in relation to the spindle, a rotation source located on the axial one side of the spindle, a shaft that is connected to an output shaft of the rotation source, is axially inserted in an inner peripheral surface side of the spindle and projects from the other end side of the spindle, a planetary gear reduction device that is positioned on the axial other side of the spindle to be disposed between the shaft and the wheel and is provided with a plurality of planetary gears rotatably supported by a carrier spline-coupled to the female spline portion of the spindle, and a shaft bearing that is positioned closer to the axial one side than the carrier of the planetary gear reduction device to be disposed on the inner peripheral surface side of the spindle and rotatably supports the shaft in relation to the spindle.

The aspect of the present invention is characterized in that on the inner peripheral surface side of the spindle, a retainer is disposed to be positioned, the retainer being formed of a material different from the spindle and retaining the shaft bearing, and the retainer is provided thereon with a male spline portion spline-coupled to the female spline portion of the spindle.

According to the aspect of the present invention, the male spline portion of the retainer is spline-coupled to the female spline portion of the spindle, whereby it is possible to retain the retainer at the inner peripheral surface side of the spindle with an appropriate degree of freedom (gap) in the axial direction and in the rotational direction in a locking state. Accordingly, without disposing the attaching flange or the like, the shaft bearing can be attached to the inner peripheral surface side of the spindle.

MODE FOR CARRYING OUT THE INVENTION

Hereinafter, a dump truck according to an embodiment of the present invention will be in detail explained with reference to the accompanying drawings.

In the figure, a dump truck 1 is provided with a vehicle body 2 having a strong frame structure. Left and right front wheels 3 are rotatably arranged on the front side of the vehicle body 2, and left and right rear wheels 4 are rotatably arranged on the rear side of the vehicle body 2 (in any case, the left wheel only is shown in the figure). The left and right front wheels 3 form part of steered wheels that are steered (for a steering operation) by an operator of the dump truck 1. A front-wheel side suspension 3A formed of a hydraulic shock absorber and the like is disposed between the vehicle body 2 and the left and right front wheels 3.

Figure 1:
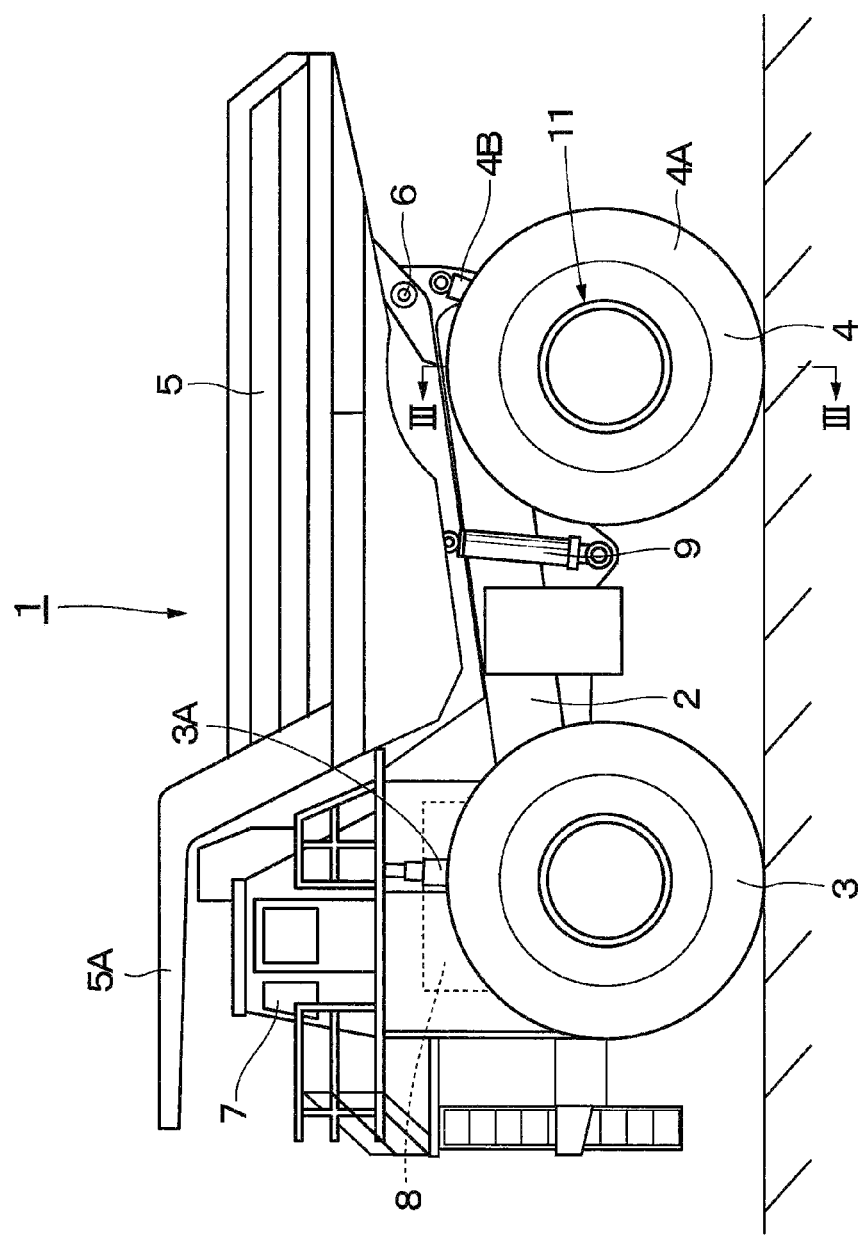
FIG. 1 is a front view showing a dump truck according to an embodiment of the present invention.
Figure 2:
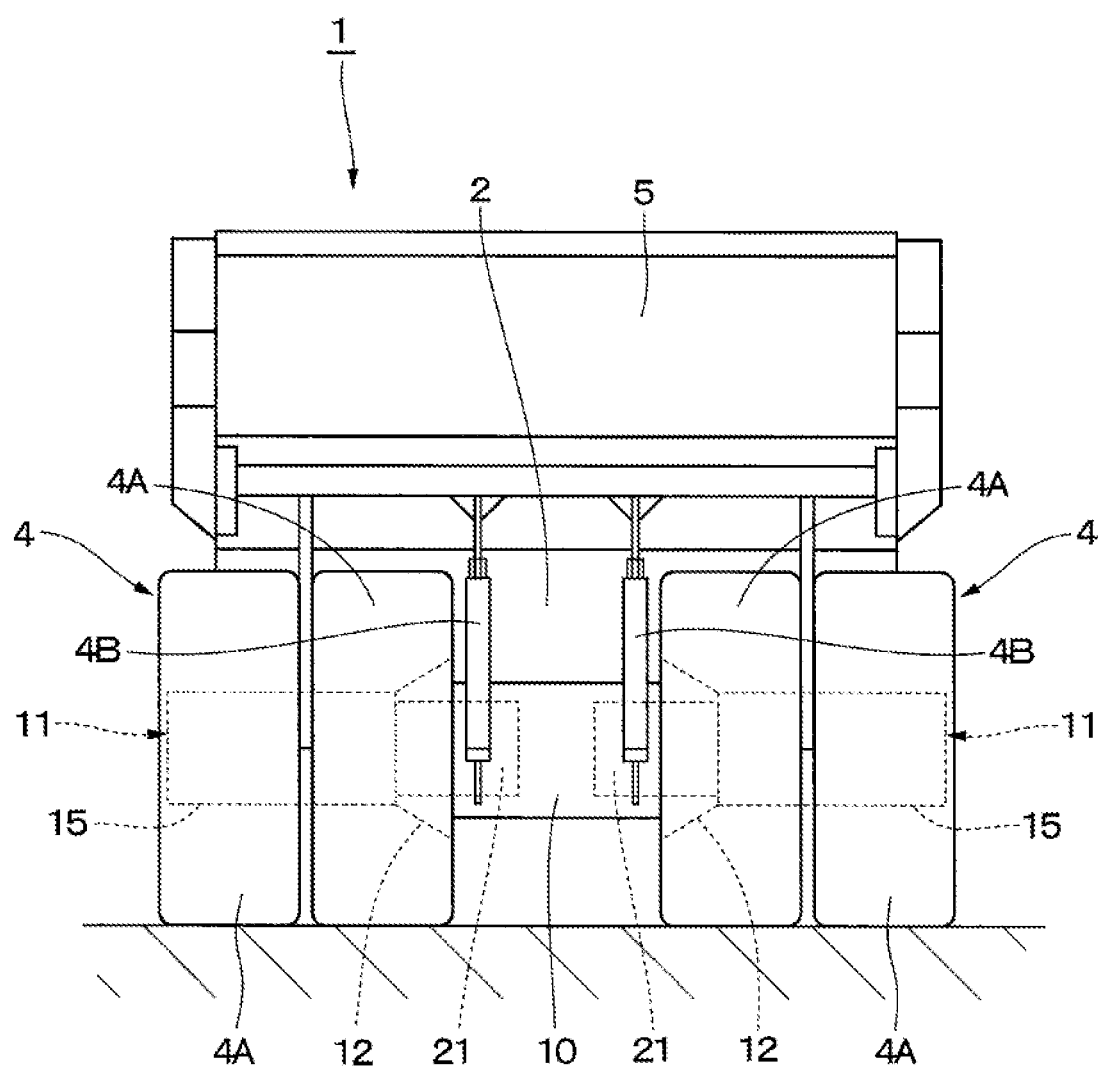
FIG. 2 is a rear view showing the dump truck in FIG. 1, as viewed from the backside.
Figure 3:
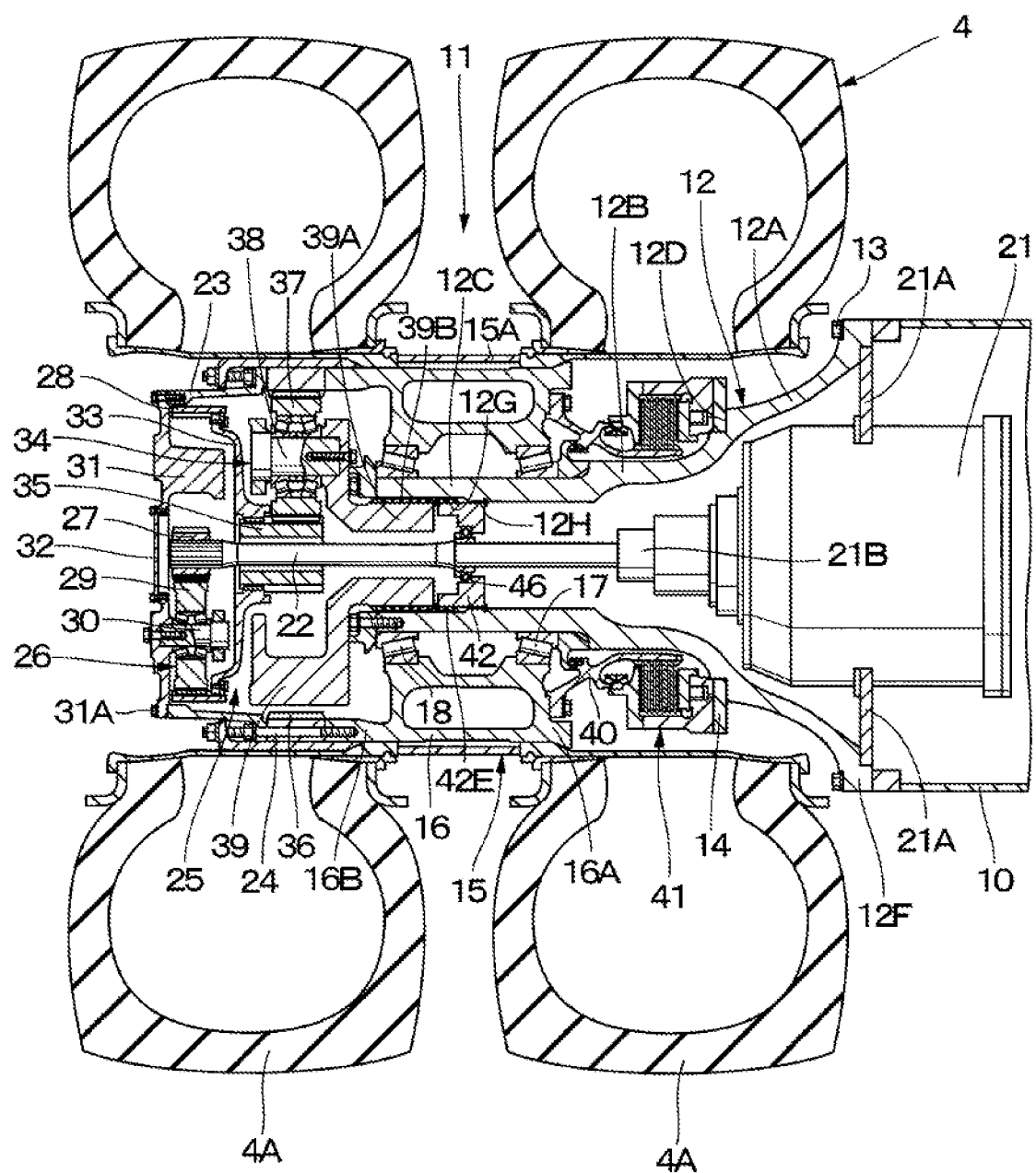
FIG. 3 is an enlarged cross section showing a vehicle drive unit on the rear wheel side, as viewed in the direction of arrows in FIG. 1.
Figure 4:
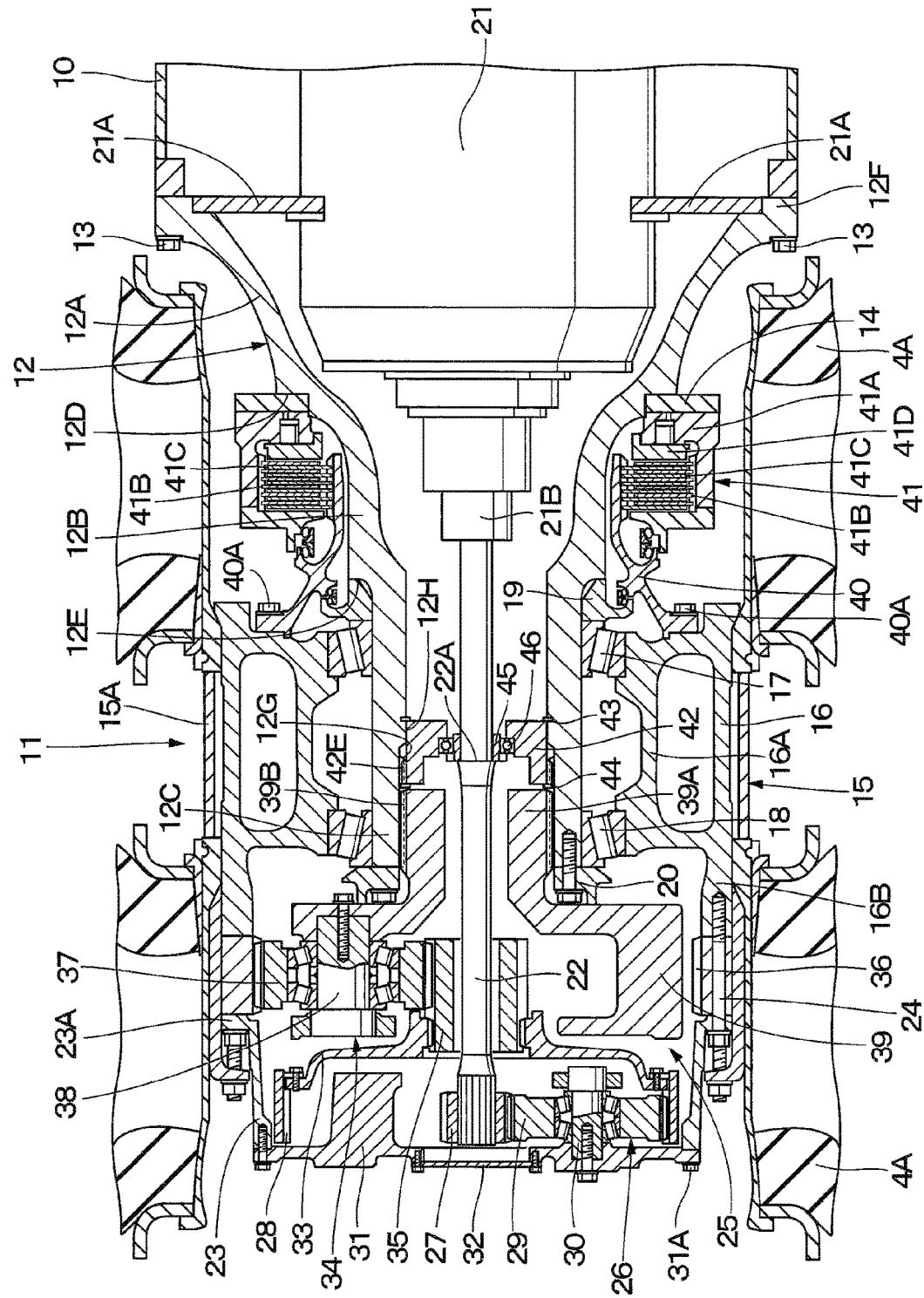
FIG. 4 is an enlarged cross section showing a spindle, an electric motor, a shaft, a retainer, a shaft bearing, a planetary gear reduction device, and the like in FIG. 3.

The left and right rear wheels 4 form part of drive wheels of the dump truck 1 and are driven and rotated by an after-mentioned vehicle drive unit 11. As shown in FIG. 2 and FIG. 3, the rear wheel 4 includes dual tires of an inner tire 4A and an outer tire 4A in the axial direction, and an after-mentioned wheel 15 on which each of the tires 4A is attached. A rear-wheel side suspension 4B formed of a hydraulic shock absorber and the like are arranged between the vehicle body 2 and the left and right rear wheels 4.

A vessel (loading platform) 5 is mounted on the vehicle body 2 to be capable of lifting and tilting. The vessel 5 is formed, for example, as a large-sized container having an entire length of 10 to 13 meters for loading a large volume of heavy baggage such as crushed stones. A rear-side bottom portion of the vessel 5 is coupled to a rear end side of the vehicle body 2 through a coupling pin 6 and the like to be capable of lifting and tilting (inclination-rotating). In addition, a protector 5A is integrally disposed on a front-side top portion of the vessel 5 in such a manner as to cover an after-mentioned cab 7 from the upper side.

The cab 7 is disposed in the front portion of the vehicle body 2 to be positioned under the protector 5A disposed on the vessel 5. The cab 7 forms part of an operator's room which an operator of the dump truck 1 gets in and off. An operator's seat, an activation switch, an accelerator pedal, a brake pedal, a handle for steering, a plurality of operating levers (none of them is shown in the figure), and the like are arranged inside the cab 7. The protector 5A of the vessel 5 protects the cab 7, for example, from flying stones such as rocks by covering the cab 7 as a whole from the upper side. In addition, the protector 5A of the vessel 5 has a function of protecting the operator within the cab 7 at the falling-down or the like of the dump truck 1.

An engine 8 is positioned under the cab 7 to be disposed on the front side of the vehicle body. The engine 8 is configured by, for example, a large-sized diesel engine, and drives anon-board power generator, a hydraulic pump as a hydraulic source (none of them is shown in the figure) and the like for rotation. Pressurized oil delivered from the hydraulic pump is supplied to after-mentioned hoist cylinders 9, a steering cylinder for power steering (not shown in the figure) and the like.

The hoist cylinder 9 is disposed to be capable of expanding and contracting in the upper-lower direction between the vehicle body 2 and the vessel 5. The hoist cylinder 9 is positioned between the front wheel 3 and the rear wheel 4 to be located on both of left and right sides of the vehicle body 2 (the left wheel only is shown in the figure). Each of the hoist cylinders 9 expands and contracts in the upper-lower direction by delivery/suction of the pressurized oil from/to the hydraulic pump to lift and tilt (inclination-rotate) the vessel 5 around the coupling pin 6.

An axle housing 10 for the rear wheel 4 is disposed on a rear lower side of the vehicle body 2 and forms part of the vehicle body 2. The axle housing 10 is formed as a cylindrical body which extends in the left-right direction between the left and right rear wheels 4. The axle housing 10 is attached through the rear-wheel side suspension 4B to the rear side of the vehicle body 2. The after-mentioned spindle 12 is fixed to each of both end sides of the axle housing 10 in the left-right direction.

The vehicle drive unit 11 is disposed on each of the left and right rear wheels 4 of the dump truck 1. As shown in FIG. 3, the vehicle drive unit 11 includes the spindle 12, a wheel 15, wheel bearings 17, 18, an electric motor 21, a shaft 22, a planetary gear reduction device 25, a retainer 42, and a shaft bearing 46, which will be described later. The vehicle drive unit 11 decelerates rotation of the electric motor 21 by the planetary gear reduction device 25 and drives the rear wheels 4 as drive wheels of the dump truck 1 by large rotational torque. It should be noted that the vehicle drive units 11 arranged respectively in the left and right rear wheels 4 are configured with the same structure. Therefore, hereinafter an explanation will be made of the vehicle drive unit 11 disposed in the left rear wheel 4.

The spindle 12 is disposed on the axial other side of the axle housing 10. The spindle 12 is formed in a stepped cylindrical shape axially extending within the after-mentioned wheel 15. The spindle 12 is configured by a large-diameter cylindrical portion 12A positioned at the axial one side, an intermediate cylindrical portion 12B positioned at the axial intermediate part and a small-diameter cylindrical portion 12C positioned at the axial other side. The large-diameter cylindrical portion 12A is formed in a cup shape to gradually reduce in diameter toward the intermediate cylindrical portion 12B. An axial one end of the large-diameter cylindrical portion 12A is fixed on an end edge portion of the axle housing 10 using a plurality of bolts 13. The small-diameter cylindrical portion 12C is formed in a cylindrical shape to be smaller in diameter than the intermediate cylindrical portion 12B and is located on an inner peripheral surface side of an after-mentioned wheel attaching cylinder 16. The small-diameter cylindrical portion 12C of the spindle 12 rotatably supports the wheel attaching cylinder 16 through the wheel bearings 17,18.

Here, the spindle 12 is formed by free forging using a core bar, for example and has a strength larger than the spindle formed by casting. The spindle 12 has an outer peripheral side on which a brake attaching portion 12D positioned in a boundary part between the large-diameter cylindrical portion 12A and the intermediate cylindrical portion 12B and an annular stepped portion 12E positioned in a boundary part between the intermediate cylindrical portion 12B and the small-diameter cylindrical portion 12C are integrally formed. An annular flange plate 14 made of a material different from the spindle 12 is fixed on the brake attaching portion 12D by means of welding or the like. An after-mentioned brake housing 41A is fixed on the flange plate 14. A motor attaching seat 12F is formed on an axial one end of the large-diameter cylindrical portion 12A, and the after-mentioned electric motor 21 is attached to the motor attaching seat 12F.

On the other hand, an axial other end (front end) of the small-diameter cylindrical portion 12C is formed as an open end, and a female spline portion 12G is formed on an inner peripheral surface of the small-diameter cylindrical portion 12C at the axial other side. A male spline portion 39B of an after-mentioned carrier 39 is spline-coupled to the female spline portion 12G, and a male spline portion 42E of the after-mentioned retainer 42 is spline-coupled to the female spline portion 12G. A retainer fitting portion 12H is disposed on an inner peripheral surface of the small-diameter cylindrical portion 12C adjacent to the female spline portion 12G. A cylindrical outer peripheral surface 42D of the retainer 42 is loosely fitted in the retainer fitting portion 12H. A one-side annular groove 12J is formed over an entire circumference on an inner peripheral surface, which is closer to an axial one side (the intermediate cylindrical portion 12B-side) than the female spline portion 12G, of the small-diameter cylindrical portion 12C (refer to FIG. 5). An after-mentioned stop ring 43 is attached to the one-side annular groove 12J. In addition, another-side annular groove 12K is formed over an entire circumference on a section, which is separated closer to the axial other side than the one-side annular groove 12J, of the female spline portion 12G formed on the small-diameter cylindrical portion 12C (refer to FIG. 5). An after-mentioned stop ring 44 is attached to the other-side annular groove 12K.

The wheel 15 is positioned in the axial other side of the spindle 12 to be disposed on the outer peripheral side of the spindle 12. The tires 4A of the rear wheel 4 are attached to the wheel 15. The wheel 15 is schematically configured by a cylindrical rim 15A extending in the left-right direction, and the wheel attaching cylinder 16 fixed and disposed on the inner peripheral surface side of the rim 15A. The two tires 4A are arranged in parallel on the outer periphery side of the rim 15A.

The wheel attaching cylinder 16 is rotatably disposed on the outer peripheral side of the spindle 12. The rim 15A of the wheel 15 is removably attached to the outer peripheral side of the wheel attaching cylinder 16 by means of press fitting or the like. The wheel attaching cylinder 16 is formed as a cylindrical body having a hollow cylindrical portion 16A and an extending cylindrical portion 16B. The hollow cylindrical portion 16A is rotatably supported through the wheel bearings 17, 18 on the spindle 12 (small-diameter cylindrical portion 12C). The extending cylindrical portion 16B axially extends toward an after-mentioned internal gear 36 from an outer peripheral side end portion of the hollow cylindrical portion 16A.

The wheel bearings 17, 18 are arranged between the small-diameter cylindrical portion 12C of the spindle 12 and the wheel attaching cylinder 16 (hollow cylindrical portion 16A) of the wheel 15. The wheel bearings 17, 18 each are configured using, for example, an identical conical bearing or the like, and rotatably support the wheel 15 on the outer peripheral side of the spindle 12. Here, an outer race of the one wheel bearing 17 is axially positioned by the hollow cylindrical portion 16A of the wheel attaching cylinder 16. An inner race of the wheel bearing 17 is axially positioned by an annular bearing retainer 19 abutting on a stepped portion 12E of the spindle 12. An outer race of the other wheel bearing 18 is axially positioned by the hollow cylindrical portion 16A of the wheel attaching cylinder 16. An inner race of the other wheel bearing 18 is axially positioned by an annular bearing retainer 20 fixed on an open end of the small-diameter cylindrical portion 12C of the spindle 12.

The electric motor 21 as the rotation source is positioned within the axle housing 10 to be disposed on the axial one side of the spindle 12. A plurality of attaching flanges 21A are arranged to a casing of the electric motor 21, and the attaching flanges 21A are removably arranged to the motor attaching seat 12F of the spindle 12 using bolts or the like. In the electric motor 21, a rotor (not shown in the figure) rotates in the forward or backward direction by supply of electric power from the power generator (not shown in the figure) mounted on the vehicle body 2, and rotation of the rotor is outputted by an output shaft 21B. A base end of the output shaft 21B is connected to be integral with the rotor of the electric motor 21, and a tip end of the output shaft 21B projects to an exterior from the casing of the electric motor 21. The shaft 22 is connected coaxially to a tip end of the output shaft 21B.

The shaft 22 is connected to the output shaft 21B of the electric motor 21. The shaft 22 is formed by a single bar element inserted axially in the inner peripheral surface side of the spindle 12 (small-diameter cylindrical portion 12C). The shaft 22 inputs the rotation of the output shaft 21B of the electric motor 21 to the planetary gear reduction device 25. An axial one side (a base end side) of the shaft 22 is connected (spline-coupled) to the output shaft 21B of the electric motor 21. An axial other side (a tip end side) of the shaft 22 projects from the axial other end of the spindle 12 (the open end of the small-diameter cylindrical portion 12C) toward the planetary gear reduction device 25. An after-mentioned sun gear 27 is attached to the tip end of the shaft 22. In addition, a bearing attaching portion 22A in which a step is axially formed is disposed on an axial intermediate section of the shaft 22. The shaft bearing 46 is attached on the bearing attaching portion 22A. The axial intermediate section of the shaft 22 is rotatably supported on the spindle 12 (small-diameter cylindrical portion 12C) by the shaft bearing 46.

An outer drum 23 forms part of the wheel attaching cylinder 16 together with the internal gear 36. The outer drum 23 is formed in a stepped cylindrical shape having an annular flange portion 23A. The outer drum 23 sandwiches the internal gear 36 with an end edge part of the extending cylindrical portion 16B constituting the wheel attaching cylinder 16. A plurality of long bolts 24 inserted in the flange portion 23A of the outer drum 23 and the internal gear 36 are threaded in the end edge part of the extending cylindrical portion 16B. Thereby, the internal gear 36 is fixed between the extending cylindrical portion 16B of the wheel attaching cylinder 16 and the outer drum 23.

The planetary gear reduction device 25 is positioned in the axial other side of the spindle 12 to be disposed between the wheel attaching cylinder 16 of the wheel 15 and the shaft 22. The planetary gear reduction device 25 is configured by a first-stage planetary gear reduction mechanism 26 and a second-stage planetary gear reduction mechanism 34. The planetary gear reduction device 25, by transmission of the rotation of the electric motor 21 (output shaft 21B) through the shaft 22, decelerates the rotation of the electric motor 21 by two stages, which is transmitted to the wheel attaching cylinder 16. Therefore, the wheel 15 is driven and rotated together with the tires 4A of the rear wheel 4 by a large rotational force (torque).

The first-stage planetary gear reduction mechanism 26 is configured by the sun gear 27 spline-coupled to the tip end of the shaft 22, a plurality (one piece only is shown in the figure) of planetary gears 29 and the carrier 31. The plurality of planetary gears 29 are engaged to the sun gear 27 and a ring-shaped internal gear 28. The carrier 31 rotatably supports the plurality of planetary gears 29 through support pins 30.

The carrier 31 is removably fixed at its outer peripheral side on an end surface at the axial other side of the outer drum 23 united with the wheel attaching cylinder 16 by a plurality of bolts 31A. A disk-shaped lid plate 32 is removably attached to the carrier 31 at the inner peripheral surface side using bolts or the like. The lid plate 32 is removed from the carrier 31, for example, at the time of maintenance or inspection of engaging portions between the sun gear 27 and the planetary gears 29.

The ring-shaped internal gear 28 is formed by using a ring gear to surround the sun gear 27 and the plurality of planetary gears 29 from a radial outside, and is relatively rotatably located through a radial gap to an inner peripheral surface of the outer drum 23. Internal teeth are formed on an inner peripheral surface of the internal gear 28 over an entire circumference thereof, and the plurality of planetary gears 29 are all the time engaged to the internal teeth. The rotation of the internal gear 28 is transmitted through a coupling 33 to the second-stage planetary gear reduction mechanism 34.

As the sun gear 27 is rotated integrally with the shaft 22 by the electric motor 21, the first-stage planetary gear reduction mechanism 26 converts the rotation of the sun gear 27 into a rotating movement of each of the planetary gears 29 on its axis and a revolving movement thereof. Further, the rotating movement on its axis (rotation) of each of the planetary gears 29 is transmitted to the internal gear 28 and the rotation of the internal gear 28 is transmitted through the coupling 33 to the second-stage planetary gear reduction mechanism 34. On the other hand, the revolving movement of each of the planetary gears 29 is transmitted to the outer drum 23 as rotation of the carrier 31. In this case, the outer drum 23 is united with the wheel attaching cylinder 16 and the internal gear 36. Therefore, the revolving movement of each of the planetary gears 29 is controlled to the rotation synchronized with the internal gear 36.

The coupling 33 is disposed in a position between the first-stage planetary gear reduction mechanism 26 and the second-stage planetary gear reduction mechanism 34 and rotates integrally with the first-stage internal gear 28. An outer peripheral side of the coupling 33 is spline-coupled to the first-stage internal gear 28. An inner peripheral side of the coupling 33 is spline-coupled to an after-mentioned second-stage sun gear 35. The coupling 33 transmits rotation of the first-stage internal gear 28 to the second-stage sun gear 35 to rotate the sun gear 35 integrally with the first-stage internal gear 28.

The second-stage planetary gear reduction mechanism 34 is configured by the cylindrical sun gear 35 that is located on the outer peripheral side of the shaft 22, a plurality of planetary gears 37 (only one piece of them is shown in the figure), and the cylindrical carrier 39. The plurality of planetary gears 37 are engaged to the sun gear 35 and the ring-shaped internal gear 36. The carrier 39 rotatably supports the plurality of planetary gears 37 through support pins 38.

Here, the second-stage internal gear 36 is formed using a ring gear surrounding the sun gear 35 and the plurality of planetary gears 37 from a radial outside. The internal gear 36 is integrally fixed between the wheel attaching cylinder 16 (the extending cylindrical portion 16B) and the outer drum 23 using long bolts 24. Internal teeth are formed on the inner peripheral surface of the internal gear 36 over an entire circumference thereof, and the plurality of planetary gears 37 are engaged to the internal teeth.

A cylindrical projecting portion 39A is formed in the center part of the second-stage carrier 39 integrally therewith to project toward the spindle 12. The male spline portion 39B is formed on an outer peripheral surface of the cylindrical projecting portion 39A at an axial one side (at the spindle 12-side) thereof. The male spline portion 39B of the carrier 39 is spline-coupled to the female spline portion 12G of the spindle 12 (small-diameter cylindrical portion 12C). Accordingly, the carrier 39 is configured to be incapable of rotating relative to the spindle 12.

Therefore, the revolving movement of the respective planetary gear 37 (rotation of the carrier 39) is restrained by the spindle 12. As the sun gear 35 is put in rotation integrally with the coupling 33, the second-stage planetary gear reduction mechanism 34 converts the rotation of the sun gear 35 into rotation of the planetary gear 37 on its axis. The rotation of the planetary gear 37 on its axis is transmitted to the internal gear 36, which causes the internal gear 36 to be decelerated for rotation. Therefore, the rotational torque of large output obtained by speed reduction of two stages through the first-stage planetary gear reduction mechanisms 26 and the second-stage planetary gear reduction mechanisms 34 is transmitted to the wheel attaching cylinder 16 to which the internal gear 36 is fixed, whereby the rear wheel 4 is driven for rotation.

A brake hub 40 is attached to the wheel attaching cylinder 16. The brake hub 40 is formed as a cylindrical body axially extending between the wheel attaching cylinder 16 and an after-mentioned wet brake device 41. An axial other side of the brake hub 40 (the wheel attaching cylinder 16-side) is fixed to a hollow cylindrical portion 16A of the wheel attaching cylinder 16 by bolts 40A. An axial one side of the brake hub 40 radially faces an outer peripheral surface of the intermediate cylindrical portion 12B of the spindle 12.

The wet brake device 41 is disposed through the brake hub 40 between the spindle 12 and the wheel attaching cylinder 16. The wet brake device 41 is configured by a wet multi-plate type of hydraulic brake and applies braking forces to the wheel attaching cylinder 16. The wet brake device 41 has a brake housing 41A. The brake housing 41A is attached to the flange plate 14 fixed to the brake attaching portion 12D of the spindle 12. A plurality of non-rotation-side brake plates 41B and a plurality of rotation-side brake plates 41C are arranged within the brake housing 41A. The plurality of non-rotation-side brake plates 41B and the plurality of rotation-side brake plates 41C are arranged to axially alternately overlap with each other. An outer peripheral side of the non-rotation-side brake plate 41B is engaged to the brake housing 41A. An inner peripheral side of the rotation-side brake plate 41C is engaged to the brake hub 40. A brake movable element 41D is disposed within the brake housing 41A. The brake movable element 41D axially moves by a brake liquid pressure to cause frictional contact between the plurality of non-rotation-side brake plates 41B and the plurality of rotation-side brake plates 41C.

The brake liquid pressure is supplied to an oil chamber of the brake housing 41A in response to a depressing operation of a brake pedal (not shown in the figure). Thereby, the wet brake device 41 axially moves the brake movable element 41D. The brake movable element 41D causes the frictional contact between the plurality of non-rotation-side brake plates 41B and the plurality of rotation-side brake plates 41C. Thereby, braking forces are applied to the wheel attaching cylinder 16 on which the brake hub 40 is fixed.

Figure 6:
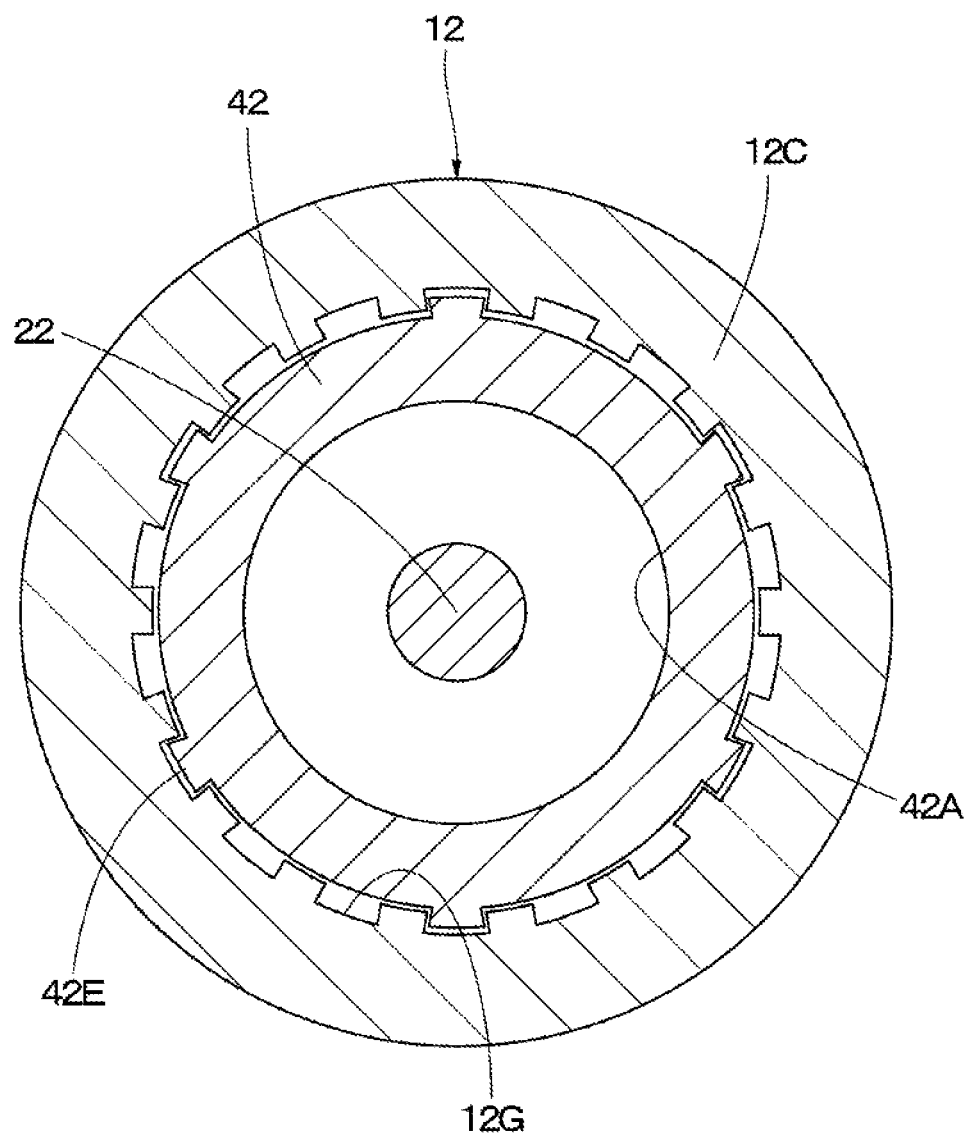
FIG. 6 is a cross section showing the female spline portion of the spindle and the male spline portion of the retainer, as viewed in the direction of arrows VI-VI in FIG. 5.
Figure 7:
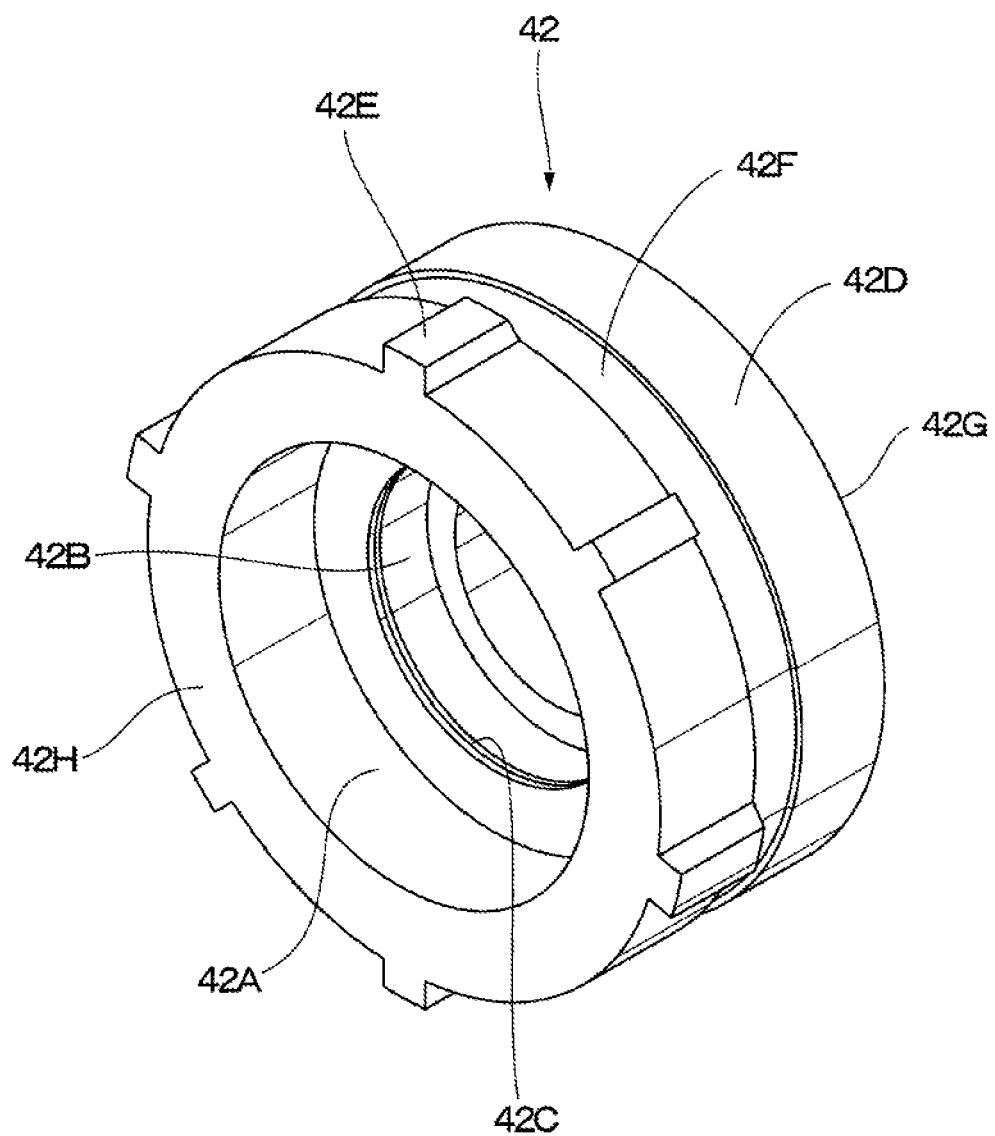
FIG. 7 is a perspective view showing the retainer as a unit.

Next, an explanation will be made of a retainer used in the present embodiment with reference to FIG. 5 to FIG. 7.

The retainer 42 is disposed on the inner peripheral surface side of the small-diameter cylindrical portion 12C configuring the spindle 12. The retainer 42 retains the shaft bearing 46 within the small-diameter cylindrical portion 12C. The retainer 42 is made of a material different (different element) from the spindle 12 and is formed in a stepped cylindrical shape as a whole. A shaft insertion hole 42A formed of a stepped hole and a bearing fitting hole 42B are formed coaxially on an inner peripheral surface side of the retainer 42. The shaft 22 is inserted in the shaft insertion hole 42A. The bearing fitting hole 42B is formed of a bottomed hole, in which the shaft bearing 46 is attached. An annular groove 42C is formed on an inner peripheral surface of the bearing fitting hole 42B over an entire circumference thereof. An after-mentioned stop ring 47 is attached on the annular groove 42C.

An axial one side (electric motor 21-side) of the retainer 42 is formed as the cylindrical outer peripheral surface 42D. The cylindrical outer peripheral surface 42D is, for example, loosely fitted in the retainer fitting portion 12H of the spindle 12. The male spline portion 42E is formed on an axial other side (planetary gear reduction device 25-side) of the retainer 42. The male spline portion 42E is spline-coupled to the female spline portion 12G formed on the small-diameter cylindrical portion 12C of the spindle 12. It should be noted that it is not necessary that the groove number of the male spline portion 42E is equal to that of the female spline portion 12G. A concavity groove 42F is disposed on an axial intermediate part of the retainer 42 over an entire circumference thereof, and the concavity groove 42F partitions the cylindrical outer peripheral surface 42D and the male spline portion 42E therebetween. The concavity groove 42F has an outer diameter dimension shorter than the cylindrical outer peripheral surface 42D and is configured to function as a back clearance to a cutting blade at the time of forming the male spline portion 42E.

The retainer 42 is configured such that in a state where the cylindrical outer peripheral surface 42D is fitted in the retainer fitting portion 12H of the spindle 12 (small-diameter cylindrical portion 12C), the male spline portion 42E is spline-coupled to the female spline portion 12G. As a result, the retainer 42 made of a material different from the spindle 12 is attached within the small-diameter cylindrical portion 12C of the spindle 12 to be in a locking state on a condition of keeping an appropriate degree of freedom (gap) in the axial direction and in the rotational direction. At this time, the cylindrical outer peripheral surface 42D of the retainer 42 is loosely fitted in the retainer fitting portion 12H of the spindle 12, and the retainer 42 is positioned in a radial direction of the spindle 12. One end surface 42G positioned in the axial one side of the retainer 42 abuts on an after-mentioned stop ring 43, and the other end surface 42H positioned in the axial other side of the retainer 42 abuts on an after-mentioned stop ring 44.

The pair of stop rings 43, 44 are arranged on an inner peripheral surface of the small-diameter cylindrical portion 12C configuring the spindle 12. The stop rings 43, 44 each are configured by a stop ring for hole. The stop ring 43 is attached to the one-side annular groove 12J of the spindle 12 and abuts on the one end surface 42G of the retainer 42. The stop ring 44 is attached to the other-side annular groove 12K of the spindle 12 and abuts on the other end surface 42H of the retainer 42. In this way, the one end surface 42G of the retainer 42 abuts on the stop ring 43 and the other end surface 42H of the retainer 42 abuts on the stop ring 44, whereby an axial movement of the retainer 42 in relation to the spindle 12 is restricted.

Figure 5:
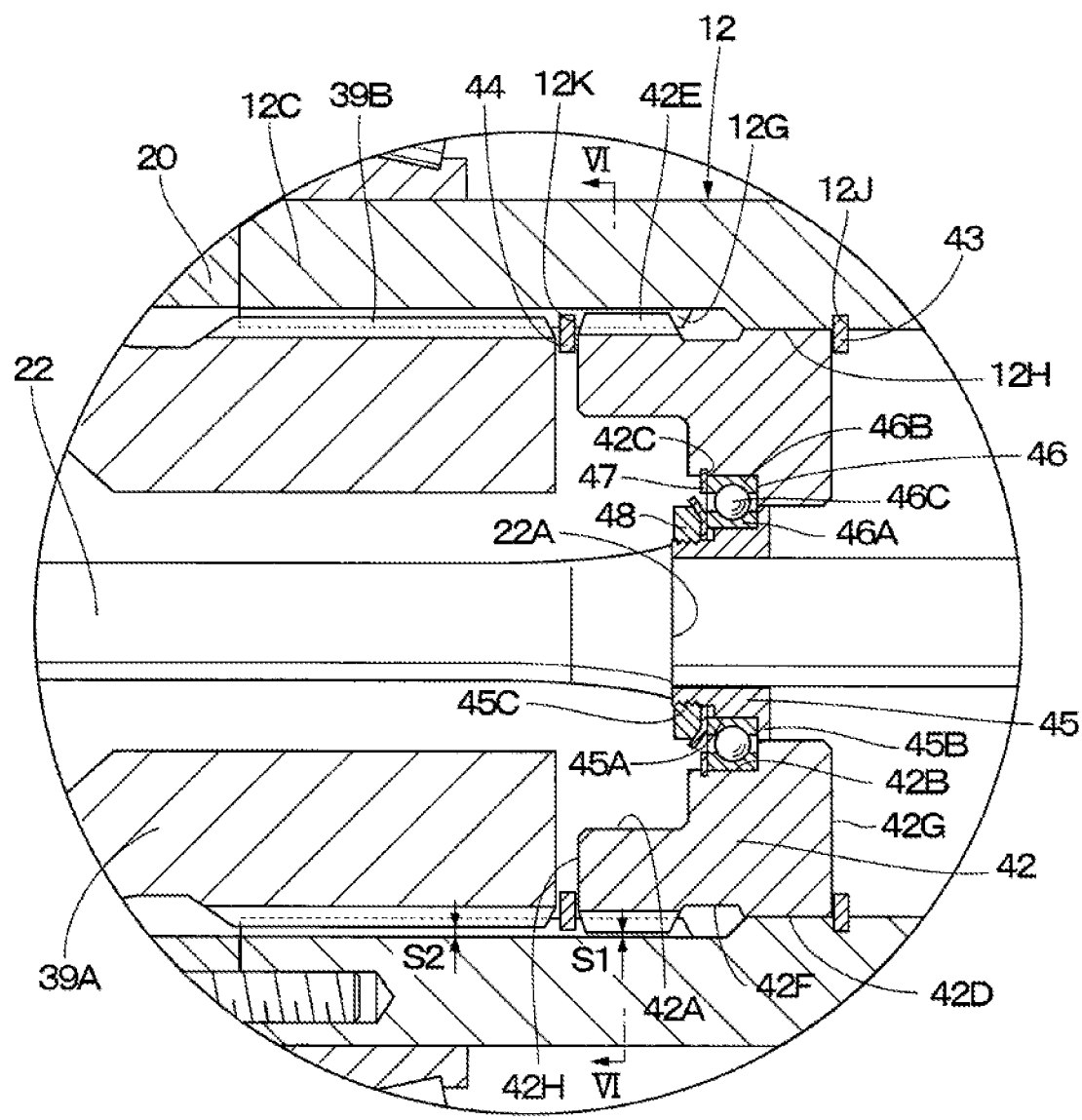
FIG. 5 is an enlarged cross section showing an essential part of the spindle, a female spline portion, the retainer, a male spline portion, the shaft bearing and the like in FIG. 4.

Here, as shown in FIG. 5, a radial gap formed between the female spline portion 12G of the spindle 12 and the male spline portion 42E of the retainer 42 is defined as S1. In addition, a radial gap formed between the female spline portion 12G of the spindle 12 and the male spline portion 39B of the carrier 39 is defined as S2. The radial gap S1 is set to be smaller than the radial gap S2 (S1<S2).

In this way, the radial gap S2 between the female spline portion 12G of the spindle 12 and the male spline portion 39B of the carrier 39 is set to be relatively large. Thereby, for example, in a case where core misalignment is made between a center axis of the internal gear 36 and a center axis of the shaft 22, the carrier 39 can move radially in a range of the radial gap S2. As a result, when the rotation of the shaft 22 is decelerated by the planetary gear reduction device 25, it is possible to automatically adjust (align) the center axis of the internal gear 36 and the center axis of the shaft 22. On the other hand, the radial gap S1 between the female spline portion 12G of the spindle 12 and the male spline portion 42E of the retainer 42 is set to be relatively small. Thereby, it is possible to suppress the retainer 42 from radially rattling in the spindle 12. Accordingly, the shaft bearing 46 retained by the retainer 42 can stably retain the axial intermediate part of the shaft 22.

A sleeve 45 is disposed in the bearing attaching portion 22A of the shaft 22. The sleeve 45 includes a cylindrical bearing fitting portion 45A, a collar portion 45B, and a male screw portion 45C. The collar portion 45B is formed in a disc shape having a diameter larger than that of the bearing fitting portion 45A. The male screw portion 45C is disposed at the opposite side to the collar portion 45B to put the bearing fitting portion 45A in between. The sleeve 45 has an inner peripheral side as press-fitted into the shaft 22. The sleeve 45 is united with the shaft 22 in a position of abutting on the bearing attaching portion 22A.

The shaft bearing 46 is positioned closer to an axial one side than the carrier 39 in the planetary gear reduction device 25 to be disposed on the inner peripheral surface side of the spindle 12. The shaft bearing 46 is retained between the retainer 42 attached to the inner peripheral surface side of the spindle 12 (small-diameter cylindrical portion 12C) and the sleeve 45. The shaft bearing 46 rotatably supports the shaft 22 in relation to the spindle 12. The shaft bearing 46 includes an inner race 46A, an outer race 46B, and many rolling elements 46C arranged between the inner race 46A and the outer race 46B. The inner race 46A is fitted in the bearing fitting portion 45A of the sleeve 45. The outer race 46B is fitted in the bearing fitting hole 42B of the retainer 42.

The outer race 46B of the shaft bearing 46 is fitted in the bearing fitting hole 42B of the retainer 42 and is axially positioned by the stop ring 47. The inner race 46A of the shaft bearing 46 is axially positioned between a nut 48 screwed to the male screw portion 45C of the sleeve 45 and the collar portion 45B of the sleeve 45. Thereby, the axial intermediate part of the shaft 22 is supported by the shaft bearing 46 to suppress the core swing at the axial intermediate part of the long shaft 22.

The dump truck 1 according to the present embodiment has the configuration as described above, and next, an operation thereof will be explained.

First, when an operator which gets in the cab 7 of the dump truck 1 activates the engine 8, the hydraulic pump as a hydraulic source is driven and rotated and electric power is generated by the power generator (none thereof is shown in the figure). At the time the dump truck 1 is driven to travel, the electric power is supplied from the power generator to the electric motor 21. Thereby the electric motor 21 is activated to rotate the output shaft 21B, and the shaft 22 connected to the output shaft 21B is rotated.

The rotation of the shaft 22 is transmitted from the sun gear 27 of the first-stage planetary gear reduction mechanism 26 to the plurality of planetary gears 29. The rotation of each of the plurality of planetary gears 29 is transmitted through the internal gear 28 and the coupling 33 to the sun gear 35 of the second-stage planetary gear reduction mechanism 34. The rotation of the sun gear 35 is transmitted to the plurality of planetary gears 37. At this time, the male spline portion 39B of the carrier 39 supporting the planetary gears 37 is spline-coupled to the female spline portion 12G of the spindle 12 (small-diameter cylindrical portion 12C). Therefore, the rotation of the carrier 39 (the revolving movements of the respective planetary gears 37) is restricted.

As a result, each of the planetary gears 37 rotates only on its axis around the sun gear 35, and the rotation decelerated by the rotation of each of the planetary gears 37 on its axis is transmitted to the internal gear 36 fixed to the wheel attaching cylinder 16. Thereby, the wheel attaching cylinder 16 rotates with the large rotational torque obtained by the speed reduction of the two stages through the first-stage planetary gear reduction mechanisms 26 and the second-stage planetary gear reduction mechanisms 34. In consequence, the left and right rear wheels 4 as the drive wheel can rotate together with the wheel attaching cylinder 16 to drive the dump truck 1 for travel.

The dump truck 1 travels between a loading work area and a discharging work area. In the loading work area, cargoes of crushed stones excavated in the mine or the like are loaded on the vessel 5. In the discharging work area, the cargoes loaded on the vessel 5 are discharged.

Incidentally, in the large-sized dump truck 1 used in the mine or the like, not only the weight of the vehicle body 2 is large but also the weight of the cargo loaded on the vessel 5 is large. As a result, large loads act on the spindle 12 supporting the rear wheel 4 through the wheel 15 by the weight of the vehicle body 2 and the weight of the cargo. In this case, by forming the spindle 12 by forging, it is possible to enhance the strength of the spindle 12 more than the spindle formed by casting. However, in a case of forming the spindle 12 by forging, it is difficult to form an attaching flange for attaching the retainer 42 or the like on the inner peripheral surface side of the spindle 12.

On the other hand, according to the present embodiment, the male spline portion 42E is formed on the retainer 42 disposed on the inner peripheral surface side of the spindle 12. The male spline portion 42E is spline-coupled to the female spline portion 12G of the spindle 12. Thereby, even in a case of forming the spindle 12 high in strength by forging, it is possible to attach the retainer 42 to the spindle 12 in the locking state. In addition, it is possible to rotatably support the axial intermediate part of the shaft 22 by the shaft bearing 46 retained by the retainer 42. Accordingly, the core swing in the axial intermediate part of the long shaft 22 is restricted. The rotation of the electric motor 21 (output shaft 21B) is smoothly transmitted through the shaft 22 to the planetary gear reduction device 25.

As a result, it is possible to cause the dump truck 1 to stably travel by the vehicle drive unit 11. In addition, it is possible to enhance the strength of the spindle 12 by forming the spindle 12 by forging. Accordingly, even in a case where the dump truck 1 is large-sized, it is possible to improve the durability of the vehicle drive unit 11. Further, the spindle 12 formed by forging has the strength higher than the spindle formed casting and in addition thereto, can be formed in a compact manner. Therefore, it is possible to achieve the lightweight of the spindle 12. As a result, the dump truck 1 provided with the spindle 12 formed by forging can increase the capacity of the loading object by the amount corresponding to a reduction in vehicle body weight to enhance the workability at the time of transporting the loading object.

In this way, the dump truck 1 according to the present embodiment is provided with the vehicle drive unit 11 including the cylindrical spindle 12 the axial one side of which is attached to the vehicle body 2 and on the axial other side of which the female spline portion 12G is formed, the wheel 15 that is positioned in the axial other side of the spindle 12 to be disposed on the outer peripheral side of the spindle 12 and to which the tire 4A is attached, the wheel bearings 17, 18 that are arranged between the spindle 12 and the wheel 15 to rotatably support the wheel 15 in relation to the spindle 12, the electric motor 21 located on the axial one side of the spindle 12, the shaft 22 that is connected to the output shaft 21B of the electric motor 21, is inserted axially in the inner peripheral surface side of the spindle 12 and projects from the axial other side of the spindle 12, the planetary gear reduction device 25 that is positioned in the axial other side of the spindle 12 to be disposed between the shaft 22 and the wheel 15 and includes the plurality of planetary gears 37 rotatably supported by the carrier 39 spline-coupled to the female spline portion 12G of the spindle 12, and the shaft bearing 46 that is positioned closer to the axial one side than the carrier 39 of the planetary gear reduction device 25 to be disposed on the inner peripheral surface side of the spindle 12 and rotatably supports the shaft 22 in relation to the spindle 12.

In addition, the retainer 42 is disposed and positioned on the inner peripheral surface side of the spindle 12, the retainer 42 being formed of a material different (different element) from the spindle 12 and retaining the shaft bearing 46, and the male spline portion 42E spline-coupled to the female spline portion 12G of the spindle 12 is disposed on the retainer 42.

Thereby, the male spline portion 42E of the retainer 42 is spline-coupled to the female spline portion 12G of the spindle 12. Accordingly, it is possible to retain the retainer 42 at the inner peripheral surface side of the spindle 12 with an appropriate degree of freedom (gap) in the axial direction and in the rotational direction in the locking state. Accordingly, even in a case of using the spindle 12 difficult to dispose the attaching flange or the like on the inner peripheral surface side, the shaft bearing 46 can be attached through the retainer 42 formed as the different material to the inner peripheral surface side of the spindle 12. As a result, it is possible to rotatably support the axial intermediate part of the long shaft 22 by the shaft bearing 46 and restrict the core swing of the shaft 22. Accordingly, the rotation of the electric motor 21 (output shaft 21B) can be smoothly transmitted through the shaft 22 to the planetary gear reduction device 25. Thereby, it is possible to cause the dump truck 1 to stably travel by vehicle drive unit 11.

In the present embodiment, the radial gap S1 formed between the female spline portion 12G of the spindle 12 and the male spline portion 42E of the retainer 42 is set to be smaller than the radial gap S2 formed between the female spline portion 12G of the spindle 12 and the male spline portion 39B formed in the carrier 39.

In this way, the radial gap S2 is set to be relatively large, and thereby, for example, even in a case where the core misalignment is made between the center axis of the internal gear 36 and the center axis of the shaft 22, the carrier 39 can move radially in a range of the radial gap S2. As a result, when the rotation of the shaft 22 is decelerated by the planetary gear reduction device 25, it is possible to automatically adjust (align) the center axis of the internal gear 36 and the center axis of the shaft 22. On the other hand, the radial gap S1 is set to be relatively small, and thereby, it is possible to suppress the retainer 42 from radially rattling within the spindle 12. Accordingly, the shaft bearing 46 retained by the retainer 42 can stably retain the axial intermediate part of the shaft 22.

In the present embodiment, the pair of the stop rings 43, 44 restricting the axial movement of the retainer 42 and the retainer fitting portion 12H of radially positioning the retainer 42 by the fitting of the cylindrical outer peripheral surface 42D therein are arranged on the inner peripheral surface of the spindle 12.

As a result, the axial movement of the retainer 42 to the spindle 12 is restricted by the pair of the stop rings 43, 44. In addition, the radial movement of the retainer 42 to the spindle 12 is restricted by the retainer fitting portion 12H. As a result, it is possible to position the retainer 42 in the axial direction and in the radial direction in relation to the spindle 12.

It should be noted that the embodiment shows a case of using the spindle 12 formed by forging, as an example. However, the present invention is not limited thereto, but the retainer 42 may be attached to an inner peripheral surface side of a spindle formed by casting, for example. In this case, since it is not necessary to dispose an attaching flange or the like on the inner peripheral surface side of the spindle, the shape of the casting die can be simplified and the casting die can be manufactured in less costs.

The embodiment shows as an example a case where the groove number of the female spline portion 12G formed in the spindle 12 is different from that of the male spline portion 42E formed in the retainer 42. However, the present invention is not limited thereto, but the groove number of the male spline portion 42E in the retainer 42 may be formed to be equal to that of the female spline portion 12G in the spindle 12.

The embodiment is explained by taking the dump truck 1 of a rear-wheel drive type as an example. However, the present invention is not limited thereto, but the present invention may be applied to a dump truck of a front-wheel drive type or a four-wheel drive type driving front and rear wheels together.

DESCRIPTION OF REFERENCE NUMERALS

1: DUMP TRUCK
2: VEHICLE BODY
3: FRONT WHEEL (VEHICLE WHEEL)
4: REAR WHEEL (VEHICLE WHEEL)
4A: TIRE
11: VEHICLE DRIVE UNIT
12: SPINDLE
12G: FEMALE SPLINE PORTION
12H: RETAINER FITTING PORTION
15: WHEEL
17, 18: WHEEL BEARING
21: ELECTRIC MOTOR (ROTATION SOURCE)
21B: OUTPUT SHAFT
22: SHAFT
25: PLANETARY GEAR REDUCTION DEVICE
29, 37: PLANETARY GEAR
31, 39: CARRIER
39B: MALE SPLINE PORTION (OTHER MALE SPLINE PORTION)
42: RETAINER
42D: CYLINDRICAL OUTER PERIPHERAL SURFACE (OUTER PERIPHERAL SURFACE)
42E: MALE SPLINE PORTION
43, 44; STOP RING
46: SHAFT BEARING
S1, S2: RADIAL GAP

The invention claimed is:
1. A dump truck provided with a vehicle drive unit comprising:
a cylindrical spindle, an axial one side of which is attached to a vehicle body and on an inner peripheral surface at an axial other side of which a female spline portion is formed;
a wheel that is positioned in the axial other side of the spindle to be disposed on an outer peripheral side of the spindle and on which a tire is attached;
wheel bearings that are arranged between the spindle and the wheel to rotatably support the wheel in relation to the spindle;
a rotation source located on the axial one side of the spindle;
a shaft that is connected to an output shaft of the rotation source, is inserted axially in an inner peripheral surface side of the spindle and projects from the other end side of the spindle;
a planetary gear reduction device that is positioned in the axial other side of the spindle to be disposed between the shaft and the wheel and is provided with a plurality of planetary gears rotatably supported by a carrier spline-coupled to the female spline portion of the spindle; and a shaft bearing that is positioned closer to the axial one side than the carrier in the planetary gear reduction device to be disposed on the inner peripheral surface side of the spindle and rotatably supports the shaft in relation to the spindle, wherein on the inner peripheral surface side of the spindle, a retainer is disposed to be positioned, the retainer being formed of a material different from the spindle and retaining the shaft bearing;

the retainer is provided thereon with a male spline portion spline-coupled to the female spline portion of the spindle; and a radial gap formed between the female spline portion of the spindle and the male spline portion of the retainer is set to be smaller than a radial gap formed between the female spline portion of the spindle and another male spline portion formed in the carrier.

2. The dump truck according to claim 1, wherein a pair of stop rings restricting an axial movement of the retainer and a retainer fitting portion of radially positioning the retainer by the fitting of an outer peripheral surface of the retainer are arranged on the inner peripheral surface of the spindle.

\* \* \* \* \*